Aug. 16, 1960 M. A. SCHUMANN ET AL 2,949,252

WIRE STORAGE AND PAY OUT DEVICE

Filed April 30, 1959 2 Sheets-Sheet 1

Alvin C. Du Vall
Marvin A. Schumann
INVENTORS

BY Clarence A. O'Brien
and Harvey B. Jacobson
Attorneys

WIRE STORAGE AND PAY OUT DEVICE
Filed April 30, 1959
2 Sheets-Sheet 2
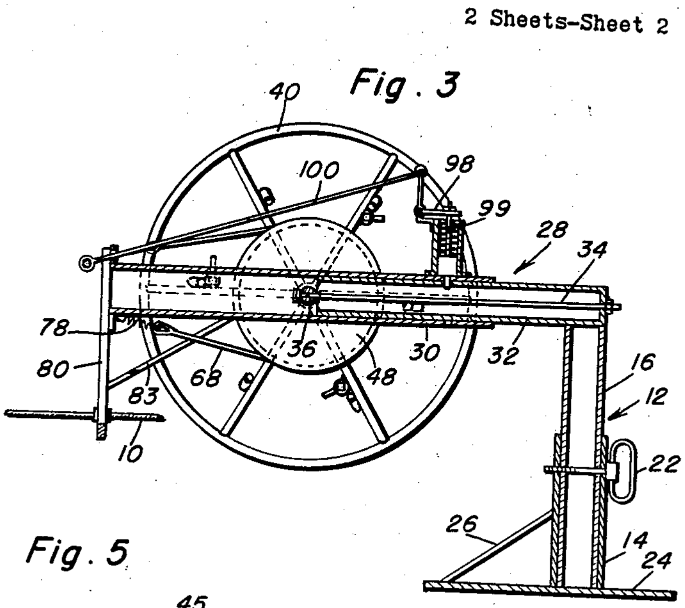
Fig. 9
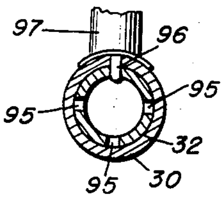
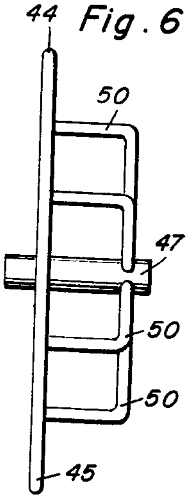
Fig. 5
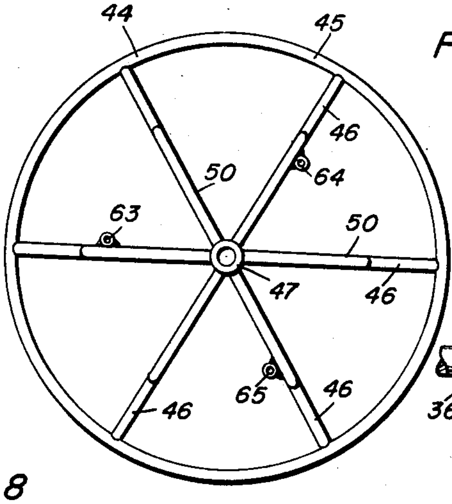
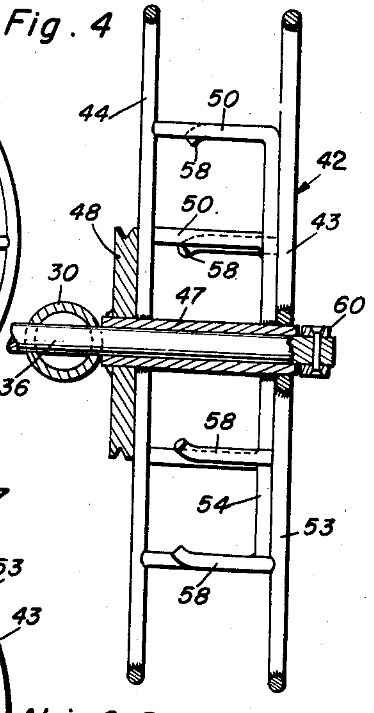
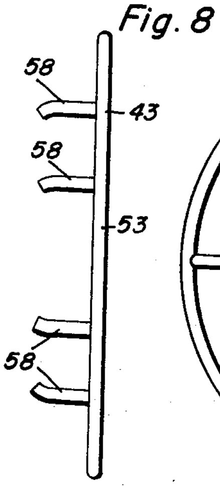
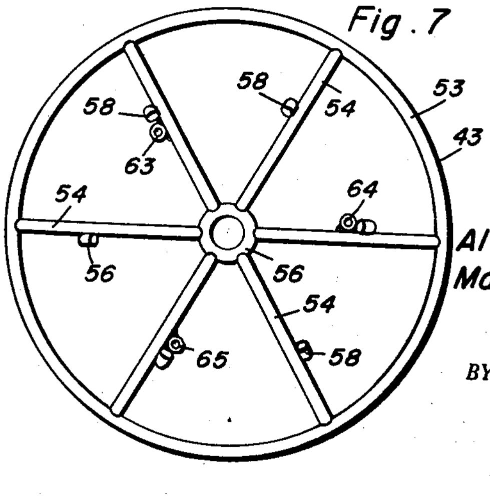
Alvin C. Du Vall
Marvin A. Schumann
INVENTORS
BY Clarence A. O'Brien and Harvey B. Jacobson
Attorneys 2,949,252

WIRE STORAGE AND PAY OUT DEVICE

Marvin A. Schumann, Carrington, and Alvin C. Du Vall, Bottineau, N. Dak.

Filed Apr. 30, 1959, Ser. No. 814,943

3 Claims. (Cl. 242—85)

This invention relates to reels for storing and paying out wire, particularly electrical conductors as those used in telephone communications.

An object of the invention is to provide an improved device wherein wire may be directly placed without having to wind it on the reel, the device being of a nature which makes the paying out of the wire easy in that a movable guide for this purpose is provided on the device and the reel or reels are adjustable to selected positions.

By having one or more, preferably two reels arranged for rotation on a shaft, each reel being made of separable sections, many of the inherent disadvantages of the solid reel are overcome. For example in transposing wires neither has to be cut or required to run over one another. Such transposition is not uncommon in telephone work. In addition the wire is easily removed and replaced from the reels lending versatility to the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a longitudinal sectional view of the device in Figure 1;

Figure 4 is a sectional view taken on the line 4—4 of Figure 1 with parts in the background being omitted;

Figure 5 is an elevational view of one section of the reel;

Figure 6 is an elevational view of the reel in Figure 5;

Figure 7 is an elevational view of the other section of the reel;

Figure 8 is an end view of the reel section of Figure 7;

Figure 9 is an enlarged transverse sectional view showing the latch for holding the reels in the selected position;

Figure 1:
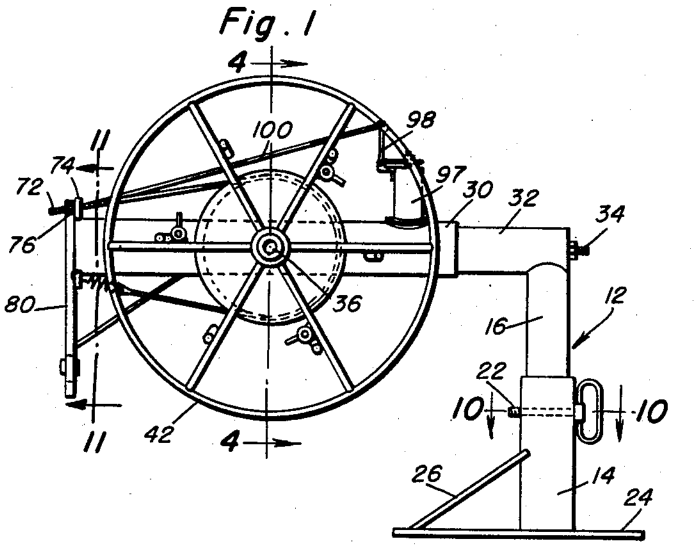
Figure 1 is an elevational view of a wire storage and pay out device which is constructed in accordance with the invention.
Figure 12:
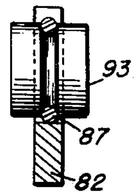
Figure 12 is a sectional view taken on the plane of line 12—12 of Figure 11.
Figure 2:
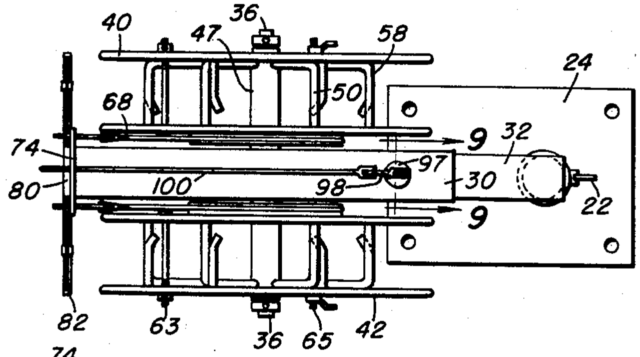
Figure 2 is a top plan view of the structure in Figure 1.
Figure 11:
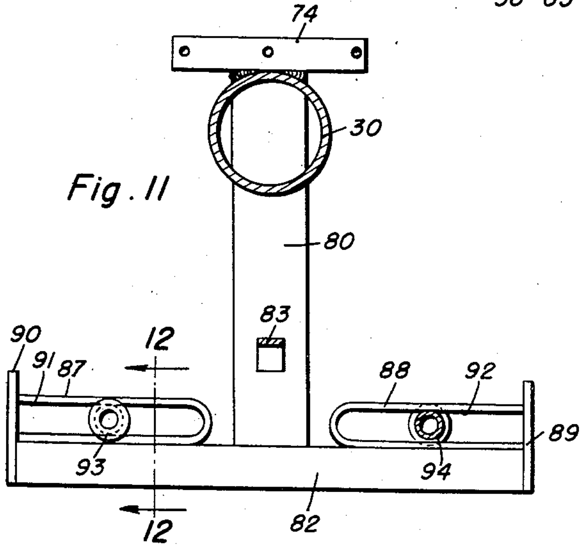
Figure 11 is an enlarged sectional view taken on the line 11—11 of Figure 1.
Figure 10:
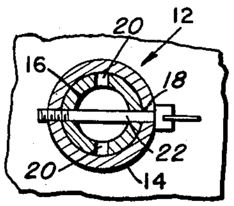
Figure 10 is a sectional view taken on the line 10—10 of Figure 1 showing the same for holding the stanchion in a selected position of adjustment.

In the accompanying drawings there is illustrated an embodiment of the combined storage and pay out device for wire, particularly electrical wire 10. The illustrated embodiment consists of a stanchion 12 that is made of an outer tube 14 together with an inner tube 16, the tubes being telescopingly arranged and provided with groups of apertures 18 and 20. A pin 22 is adapted to be passed through aligned apertures of the two groups and threaded in place. In this way the tube 16 may be rotated with respect to the tube 14 and held in the selected position of adjustment. Moreover, the stanchion may be extended by elevating tube 16 with respect to tube 14 and replacing pin 22 to hold the tubes in the adjusted position. To facilitate anchoring the stanchion 12 a base plate 24 is welded or otherwise rigidly fixed to the tube 14 and this plate may be bolted or in some other way fixed to a supporting surface, for example, a truck bed or trailer bed. Brace 26 is illustrated to typify a single or plurality of braces as would be required for strength and rigidity.

A horizontal support 28 is welded or otherwise rigidly secured to the upper end of stanchion 12. It includes a pair of sleeves 30 and 32 which are telescoped in each other. The sleeve 30 is held in place on the stanchion 16 by having a bolt 34 or rod passed through an aperture in a transverse shaft 36 and through an opening in the closed end of sleeve 32. Inasmuch as the shaft 36 passes through aligned apertures in the sleeve 30 (Figure 4) and bolt 34 passes through an opening in it, the bolt holds the sleeve 30 mounted rotatively on sleeve 32.

There are two reels 40 and 42 respectively mounted for rotation on the opposite ends of shaft 36. Each reel is identical and therefore only one has been shown in detail in the drawings. This exemplary reel 42 consists of two sections 43 and 44 that are releasably connected together, the section 44 consisting of a wall that is made of a ring 45 from which spokes 46 extend to a hub 47. Hub 47 consists of a sleeve to which a pulley 48 is fixed. Approximately L-shaped wires 50 are attached to the spokes 46 at one end and to the hub 47 at the other end in order to provide means on which to accommodate the wire 10 when it is placed on or payed from the device. Section 43 consists of a wall which is made from a wire ring 53 from which spokes 54 extend in a radial direction. The inner ends of the spokes are secured to a small ring 56 which functions as a hub. Ring 56 is fitted over the outer end of the hub 47 in assembling the two sections of the reel 42. In addition the spokes 54 have inwardly extending fingers 58 which are arranged approximately parallel to hub 47 and shaft 36 on which the reel 42 is mounted for rotation. These fingers have downturned outer ends so as to avoid interference with the wire as it is wrapped or placed on the reel or payed therefrom. The collar 60 is disposed on the outer end of the shaft 36 and has a pin holding it thereon. This prevents the reel from becoming inadvertently separated from the shaft 36. Section 44 is fixedly attached on the shaft 36 in this manner, however, the section 43 is able to be slipped outwardly from the reel for the purpose of placing wire on the reel or others as would occur to those who use the device. The means for attaching the two sections of the reel 42 together are preferably bolts such as those at 63, 64 and 65 (Figure 7) welded to selected spokes and passed through collars that are welded to the spokes of the opposite section. The outer ends of the bolts have nuts removably threaded thereon so as to hold the reel 42 assembled.

Pulley 48 has a rope 68 or other flexible elongated element, for example a belt, entrained around it. One end of the flexible element is secured to an eye bolt 72 that passes through an opening in the transverse member 74. This latter member is fixed to the sleeve 30 and there is a nut 76 thereon. By tightening the nut 76 on the eye bolt 72 the tension in the flexible member 68 is regulatable. The opposite end of the flexible elongated member has a spring 78 fixed to it, this spring being anchored to a part of the brace 80. Brace 80 is welded or otherwise fixed to the outer end of sleeve 30, and there is a transverse member 82 in the lower end thereof. Diagonal brace 83 extends from the brace 80 to the sleeve 30 to which it is welded. Transverse member 82 is provided with elongated rails that are secured to the end plates 89 and 90 on transverse member 82. Rails 87 and 88 are made by forming wires into a generally U-shape so that a slot 91 is enclosed by the wire which forms rails 87 and a slot 92 is enclosed by the wire which forms rails 88. Insulators 93 and 94 having peripheral grooves are held captive in the slots 91 and 92 by having their grooves nested with the rails 87 and 88. Therefore the insulators are capable of sliding inwardly and outwardly of the member 80. These insulators function as wire guides for the wire which is placed on and payed from the reels 40 and 42.

Sleeves 30 and 32 are capable of being adjusted rotatably with respect to each other. The sleeve 30 is rotatable on the sleeve 32 and therefore there is a group of apertures 95 in the sleeve 32, the apertures accommodating pin 96, the latter being a spring loaded detent which is operable in a housing 97 welded or otherwise rigidly fixed to the exterior of sleeve 30. The detent is actuated by a crank 98 that is operatively connected to the outer end of a rod 99, the latter constituting a part of the spring loaded detent. A hand operating lever 100 extends from the crank 98 and passes through an aperture in the member 74 for ready access of the user of the device.

In use the wire is loaded on the reels by slipping the outer section of each reel from the inner section's hub. Then the wire is loaded directly on the inner section members 50 and the other section replaced. Stanchion 12 is vertically and rotationally adjustable. The disposition of the reels 40 and 42, that is rotatable about a horizontal or vertical axis, may be adjusted by actuation of the detent and rotation of the sleeve 30 on sleeve 32 to tilt the shaft 36 and thereby tilt the reels 40, 42.

The wire 10 is threaded through the wire guide on the side of the device on which the particular reel in use is operable. Inasmuch as the wire guides 93 and 94 are movable, the guiding feature of the wire is adjustable.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for paying out wire comprising a support including inner and outer telescoping sleeves, the inner sleeve being fixed and the outer sleeve telescoped thereover and rotatably adjustable on the inner sleeve, a shaft extending transversely through the outer sleeve, a pair of reels on said shaft journaled thereon at opposite sides of said outer sleeve and together with the shaft being tiltable by rotation of the outer sleeve, a rod in said sleeves secured to said shaft and rotatably secured in one end of the inner sleeve for holding said outer sleeve on the inner sleeve while permitting rotary adjustment of the outer sleeve on the inner sleeve to tilt said reels.

2. The combination of claim 1 including a pair of wire guiding members for said reels, and means supporting said members on one end of the outer sleeve comprising a depending member on said end of the outer sleeve to which said guide members are attached at opposite sides of the depending member.

3. The combination of claim 1, said reels each including two side-by-side walls detachably connected together and one having L-shaped wire supporting rods extending laterally and radially thereof between said walls.

References Cited in the file of this patent

UNITED STATES PATENTS

| | | |
|---|---|---|
| 543,470 | Feder | July 30, 1895 |
| 760,133 | Levy | May 17, 1904 |
| 1,153,636 | Longden | Sept. 14, 1915 |
| 1,387,300 | Oliver et al. | Aug. 9, 1921 |
| 2,130,121 | Dunleavy | Sept. 13, 1938 |
| 2,201,305 | Springer | May 21, 1940 |
| 2,489,108 | Schmidt | Nov. 22, 1949 |
| 2,603,351 | Vedder | July 15, 1952 |